United States Patent
Tanaka et al.

(10) Patent No.: US 12,128,882 B2
(45) Date of Patent: Oct. 29, 2024

(54) VEHICLE, AND METHOD FOR CONTROLLING VEHICLE

(71) Applicant: HONDA MOTOR CO., LTD., Tokyo (JP)

(72) Inventors: Hiroki Tanaka, Saitama (JP); Makoto Katayama, Saitama (JP); Osamu Ito, Saitama (JP); Hideo Kadowaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 270 days.

(21) Appl. No.: 17/666,575

(22) Filed: Feb. 8, 2022

(65) Prior Publication Data

US 2022/0250615 A1    Aug. 11, 2022

(30) Foreign Application Priority Data

Feb. 10, 2021    (JP) ................................. 2021-019826

(51) Int. Cl.
*B60W 10/06*      (2006.01)
*B60W 10/18*      (2012.01)
(Continued)

(52) U.S. Cl.
CPC ............ *B60W 30/09* (2013.01); *B60W 10/18* (2013.01); *B60W 10/20* (2013.01); *G08G 1/161* (2013.01);
(Continued)

(58) Field of Classification Search
CPC ............ B62J 99/00; B62J 50/25; B62J 27/00; B60W 30/09; B60W 10/18; B60W 10/20;
(Continued)

(56) References Cited

U.S. PATENT DOCUMENTS

2014/0132407 A1 *   5/2014   Kumai .................. B60K 35/00
                                                          340/439
2014/0324287 A1    10/2014   Tsuchida
(Continued)

FOREIGN PATENT DOCUMENTS

DE    102018207406 A1 *  11/2019
JP         S60119665 U      8/1985
(Continued)

OTHER PUBLICATIONS

Decision of Refusal issued in the JP Patent Application No. 2021-019826, mailed on May 9, 2023.

*Primary Examiner* — Ian Jen
*Assistant Examiner* — Hossam M El Abd Latif
(74) *Attorney, Agent, or Firm* — CKC & Partners Co., LLC (57) ABSTRACT

A vehicle 1 as a host vehicle includes: detection unit that detects a translationally-moving two-wheeled vehicle 9 traveling in front of or alongside the host vehicle; an on-board communication device capable of communicating with a communication device mounted on the vehicle 9; an ECU that determines whether the host vehicle is at either one of blind spots BR and BL of the vehicle 9, based on a detection result of the detection unit, and that transmits a warning notification from the on-board communication device to the communication device mounted on the vehicle 9 when determining that the host vehicle is at the blind spot BR or BL. In this case, it is preferable that the ECU changes an actuation condition so that an automatic operation according to contact avoidance control is started more promptly than when the host vehicle is determined to be outside the blind spots BR, BL.

3 Claims, 3 Drawing Sheets

(51) Int. Cl.
    *B60W 10/20* (2006.01)
    *B60W 30/08* (2012.01)
    *B60W 30/09* (2012.01)
    *B60W 50/00* (2006.01)
    *B60W 60/00* (2020.01)
    *B62J 27/00* (2020.01)
    *B62J 50/25* (2020.01)
    *B62J 99/00* (2020.01)
    *G08G 1/16* (2006.01)
    *H04W 4/46* (2018.01)

(52) U.S. Cl.
    CPC ......... *G08G 1/166* (2013.01); *B60W 2300/36* (2013.01); *B60W 2554/4041* (2020.02); *B60W 2556/65* (2020.02); *B62J 99/00* (2013.01)

(58) Field of Classification Search
    CPC ..... B60W 2554/4041; B60W 2556/65; B60W 2300/36; B60W 10/06; B60W 60/0016; B60W 60/0027; B60W 30/08; B60W 50/00; G08G 1/161; G08G 1/166; G08G 1/162; H04W 4/46

USPC .......................................................... 701/26
See application file for complete search history.

(56) References Cited

U.S. PATENT DOCUMENTS

| | | | |
|---|---|---|---|
| 2015/0124096 A1* | 5/2015 | Koravadi | G06V 20/584 |
| | | | 348/148 |
| 2017/0176591 A1* | 6/2017 | Pineda-Deom | G01S 13/931 |
| 2017/0192433 A1* | 7/2017 | Kuttenberger | B62J 45/4151 |
| 2020/0231170 A1* | 7/2020 | Grelaud | B60W 30/18163 |
| 2022/0165160 A1 | 5/2022 | Maeda et al. | |

FOREIGN PATENT DOCUMENTS

| | | |
|---|---|---|
| JP | H08268188 A | 10/1996 |
| JP | 2009211309 A | 9/2009 |
| JP | 2013156703 A | 8/2013 |
| JP | 2014213778 A | 11/2014 |
| WO | 2020194715 A1 | 10/2020 |

\* cited by examiner

VEHICLE, AND METHOD FOR CONTROLLING VEHICLE

This application is based on and claims the benefit of priority from Japanese Patent Application No. 2021-019826, filed on 10 Feb. 2021, the content of which is incorporated herein by reference.

BACKGROUND OF THE INVENTION

Field of the Invention

The present invention relates to a vehicle, a method for controlling such a vehicle, and a computer program.

Related Art

In recent years, more and more vehicles are equipped with a contact avoidance device that monitors mobile bodies around a host vehicle having the device aboard, by means of a camera, a sensor, etc., to avoid contact between the host vehicle and the mobile bodies. For example, Patent Document 1 discloses a contact avoidance device configured such that when a motorcycle is in a blind spot of a host vehicle equipped with the device, the device notifies the presence of the motorcycle in the blind spot to a communication device aboard the motorcycle (more specifically, to a mobile communication terminal owned by the rider of the motorcycle). In this way, the contact avoidance device disclosed in Patent Document 1 can prevent the motorcycle from being caught under the host vehicle, especially when the host vehicle turns to the left.

Patent Document 1: Japanese Unexamined Patent Application, Publication No. 2013-156703

SUMMARY OF THE INVENTION

Meanwhile, in contrast to the situation supposed in Patent Document 1, there is a case in which a host vehicle comes into a blind spot of a motorcycle. In this case, for example, the rider of the motorcycle may suddenly change lanes without recognizing that the host vehicle is present in the blind spot of the motorcycle, giving rise to the risk of contact between the motorcycle and the host vehicle. However, measures to address this situation have not been studied in detail so far.

The present invention is intended to provide a vehicle as a host vehicle capable of preventing contact with a saddle-type vehicle traveling in front of or alongside the host vehicle, the contact being likely to be caused by, for example, a sudden lane change performed by the saddle-type vehicle. The present invention is intended to provide also a method for controlling such a vehicle, and a computer program.

(1) An embodiment of the present invention is directed to a vehicle as a host vehicle including: a saddle-type vehicle detection unit (e.g., an on-board sensor ECU 22, a camera unit 71, LiDAR units 72a, 72b, 72d, 72e, and radar units 73a, 73b, 73c to be described later) that detects a saddle-type vehicle (e.g., a translational two-wheeled vehicle 9 to be described later) traveling in front of or alongside the host vehicle in a direction in which the host vehicle moves; an on-board communication unit (e.g., a second on-board communication device 42 and an intervehicle communication ECU 25 to be described later) capable of communicating with a saddle-type vehicle's communication device (e.g., a two-wheeled vehicle's communication device 91 to be described later) mounted on the saddle-type vehicle; and a control unit (e.g., an automatic operation ECU 20 to be described later) that determines whether the host vehicle is at a blind spot (e.g., a right blind spot BR and a left blind spot BL to be described later) of the saddle-type vehicle, based on a detection result of the saddle-type vehicle detection unit, and that transmits a warning notification from the on-board communication unit to the saddle-type vehicle's communication device when determining that the host vehicle is at the blind spot.

(2) In this case, it is preferable that the vehicle as the host vehicle further includes a safe driving support device (e.g., an automatic operation ECU 20 to be described later) that performs, upon fulfillment of a predetermined actuation condition, an automatic operation of at least one of a drive device (e.g., a power plant 32 to be described later), a braking device (e.g., a braking device 33 to be described later), and a steering device (e.g., an electronic power steering device 31 to be described later) of the host vehicle, such that contact between the saddle-type vehicle and the host vehicle is avoided or lessened. It is preferable that when determining that the host vehicle is at the blind spot, the control unit changes the actuation condition so that the automatic operation is started more promptly than when determining that the host vehicle is not at the blind spot.

(1) The control unit of the vehicle as the host vehicle according to an embodiment of the present invention determines whether the host vehicle is at the blind spot of the saddle-type vehicle, based on the detection result of the saddle-type vehicle detection unit that detects the saddle-type vehicle traveling in front of or alongside the host vehicle. When determining that the host vehicle is at the blind spot, the control unit transmits the warning notification from the on-board communication unit to the saddle-type vehicle's communication device. This feature allows the rider of the saddle-type vehicle to recognize the presence of the vehicle at the blind spot of the saddle-type vehicle. Thus, the present invention can cause the rider of the saddle-type vehicle to refrain from driving the saddle-type vehicle in such a way as to interfere with the host vehicle in motion (for example, from suddenly changing lanes), thereby making it possible to prevent contact between the host vehicle and the saddle-type vehicle. The present invention allows the rider of the saddle-type vehicle to recognize the presence of the vehicle at the blind spot of the saddle-type vehicle while eliminating the need for a camera, a LiDAR, a radar, etc., thereby reducing costs of the saddle-type vehicle.

(2) The vehicle as the host vehicle according to an embodiment of the present invention includes the safe driving support device that performs an automatic operation of at least one of the drive device, the braking device, and the steering device of the host vehicle, upon fulfillment of the predetermined actuation condition, such that contact between the host vehicle and the saddle-type vehicle is avoided or lessened. When determining that the host vehicle is at the blind spot of the saddle-type vehicle, the control unit transmits the warning notification to the saddle-type vehicle's communication device and changes the actuation condition so that the automatic operation is started more quickly than when the host vehicle is determined to be outside the blind spot of the saddle-type vehicle. As a result, even in a situation where the rider of the saddle-type vehicle fails to recognize the warning notification and the saddle-type vehicle travels in such a way as to interfere with the host vehicle in motion, the automatic operation to avoid or lessen the contact can be started immediately, thereby making it possible to further reliably prevent the contact between the host vehicle and the saddle-type vehicle.

DETAILED DESCRIPTION OF THE INVENTION

A configuration of a vehicle according to an embodiment of the present invention and a configuration of an operation support system including the vehicle will be described below with reference to the drawings.

Figure 1:
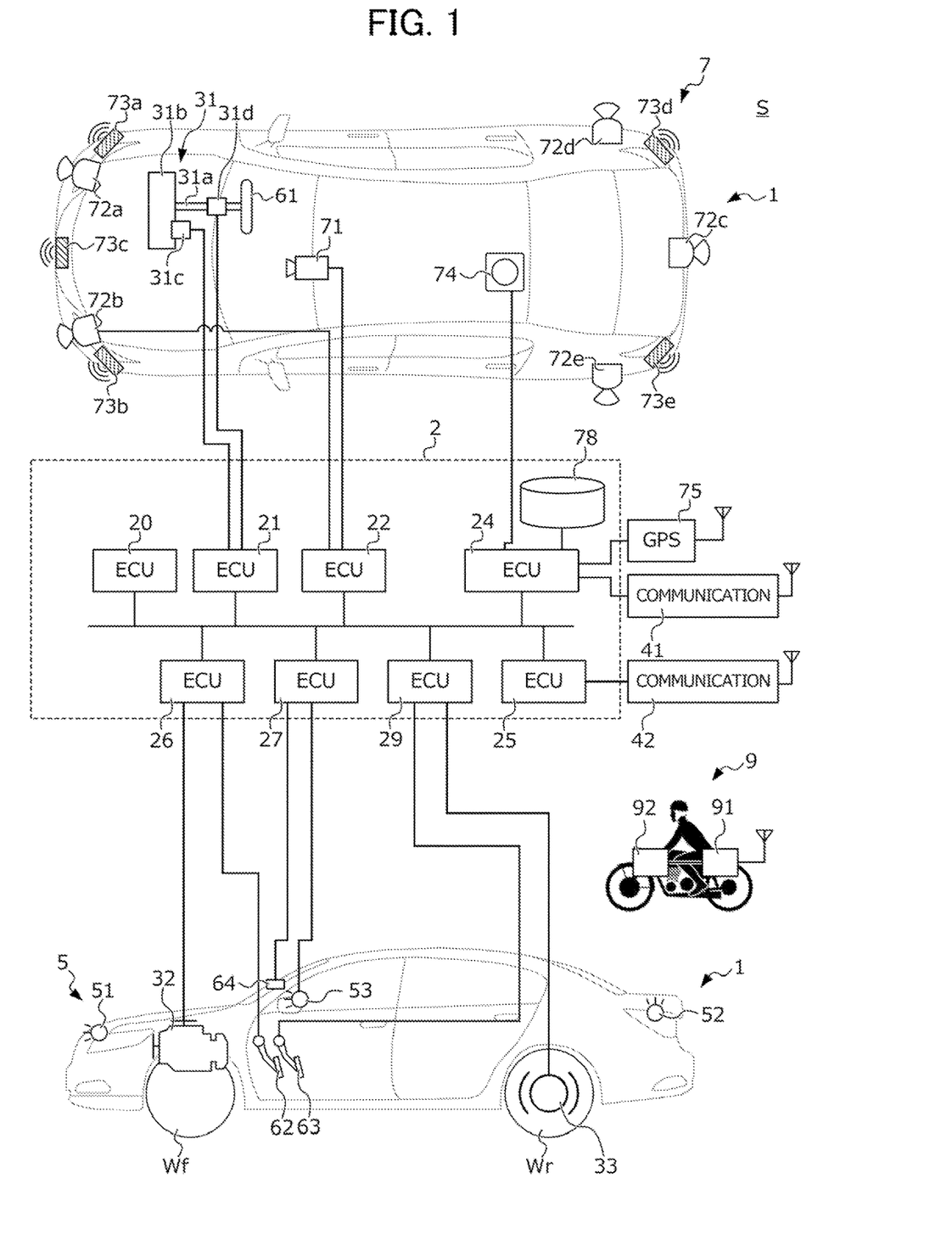
FIG. 1 is a diagram schematically illustrating a vehicle and an operation support system according to an embodiment of the present invention.

FIG. 1 is a diagram schematically illustrating a configuration of a vehicle 1 as a host vehicle according to the present embodiment and a configuration of an operation support system S including the vehicle 1. FIG. 1 illustrates a planar view and a side view of the vehicle 1 in an upper portion and a lower portion, respectively. The following description is based on a case where the vehicle 1 is a so-called right-hand drive four-wheeled vehicle having the driver's seat on the right side in the width direction when viewed in the forward direction. However, the present invention is not limited to this case. The vehicle may be a so-called left-hand drive four-wheeled vehicle having the driver's seat on the left side when viewed in the forward direction. The operation support system S includes the vehicle 1 and a motorcycle 9 as at least one saddle-type vehicle that travels near the vehicle 1 and is capable of wireless inter-vehicle communication with the vehicle 1.

Figure 2:
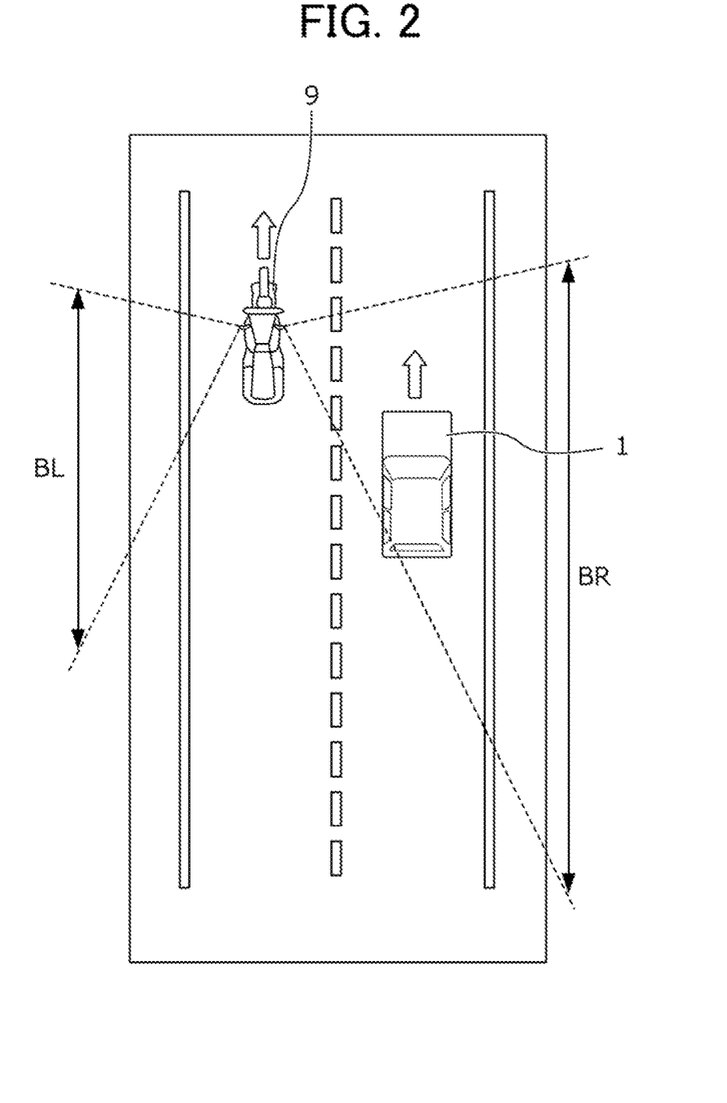
FIG. 2 is a diagram illustrating, as an example, a positional relationship between a host vehicle and a motorcycle traveling near the host vehicle.

FIG. 2 is a diagram illustrating, as an example, a positional relationship between the vehicle 1 as a host vehicle and one motorcycle 9 traveling near the host vehicle.

As illustrated in FIG. 2, the motorcycle 9 is traveling slightly to the left in front of the vehicle 1 as the host vehicle in the direction in which the host vehicle moves. In the following, the motorcycle 9 may also be referred to as the translationally-moving two-wheeled vehicle 9. In FIG. 2, reference characters "BR" and "BL" indicate blind spots, which are areas that the rider of the translationally-moving two-wheeled vehicle 9 cannot sight directly or in a mirror while the rider faces forward in the direction in which the translationally-moving two-wheeled vehicle 9 moves. In other words, as viewed from the rider of the translationally-moving two-wheeled vehicle 9, a right area and a portion a rearward right area correspond to the right blind spot BR, and a left area and a portion of a rearward left area correspond to the left blind spot BL. FIG. 2 illustrates a case where the host vehicle is traveling at the right blind spot BR of the translationally-moving two-wheeled vehicle 9.

Referring back to FIG. 1, the vehicle 1 includes: an electric power steering device 31 as a steering device that steers left and right front wheels Wf; a power plant 32 as a drive device that generates driving power to rotate the front wheels Wf as driving wheels; a braking device 33 that generates a braking force to stop the front wheels Wf and rear wheels Wr; on-board communication devices 41, 42 that communicate wirelessly with external communication devices; a group 5 of lamps including a plurality of lamps that are visible from outside the vehicle; a steering wheel 61 for a driver to perform a steering operation; an accelerator pedal 62 for the driver to perform accelerating/decelerating operations; a brake pedal 63 for the driver to perform a decelerating operation; a lamp switch 64 for the driver to turn on and off the group 5 of lamps; a sensor unit 7 installed on the vehicle body; and a control unit 2 that controls various on-board devices, such as the electric power steering device 31 and the power plant 32, based on detection signals from the sensor unit 7 and driving operations performed by the driver, etc.

The electric power steering device 31 includes a gear box 31b via which a pinion shaft. 31a extending from the steering wheel 61 is coupled to the left and right front wheels Wf, an electric motor 31c provided to the gear box 31b, and a steering sensor 31d that detects a steering angle and a steering speed of the steering wheel 61.

The gear box 31b includes, for example, a rack shaft that extends in the vehicle width direction and meshes with the pinion shaft 31a, and tie rods that couple both ends of the rack shaft to the left and right front wheels Wf. The gear box 31b converts rotational motion of the steering wheel 61, which is caused by the driver's steering operation, into motion in the vehicle width direction, thereby steering the left and right front wheels Wf into a direction of motion. The electric motor 31c rotates in response to a control signal outputted from a steering ECU 21 (to be described later) of the control unit 2, and thereby generates driving power to assist the driver in performing a steering operation or driving power to automatically steer the front wheels Wf. The steering sensor 31d detects a steering angle and a steering speed of the steering wheel 61, and thereby transmits a signal corresponding to the detected value to the steering ECU 21 of the control unit 2.

The power plant 32 is a driving power source that generates driving power to rotate the front wheels Wf as the driving wheels so that the vehicle 1 moves forward or backward in a direction of motion. In the following, a case will be described in which the power plant 32 is configured as a combination of an engine and a transmission: the engine generates, by consuming fuel stored in a fuel tank (not illustrated), driving power according to a control signal outputted from the control unit 2, and the transmission shifts and transmits the output of the engine to the front wheels Wf. However, the present invention is not limited to this case. The power plant 32 may be configured as, instead of the combination of the engine and the transmission, a drive motor that generates driving power to rotate the front wheels Wf, by consuming electric power supplied from a high-voltage battery (not illustrated) or a fuel cell stack (not illustrated).

The braking device 33 includes, for example, a disc brake device and a parking brake. The disc brake device generates, in response to, for example, a decelerating operation performed by the driver via the brake pedal 63 or a control signal outputted from the control unit 2, a braking force to decelerate or stop the rotation of the wheels Wf, Wr by tightening discs provided on the axles of the wheels Wf, Wr mainly while the vehicle is in motion. The parking brake generates a braking force to continuously prevent the wheels Wr, Wf from rotating mainly while the vehicle is in a parked state.

The group 5 of lamps includes, for example, front lamps 51, rear lamps 52, and turn signal lamps 53. The front lamps 51 include, for example, headlights and position lamps installed on both widthwise end portions of a front of the vehicle 1. The rear lamps 52 include, for example, taillights and brake lights installed on both widthwise end portions of a rear of the vehicle 1. The turn signal lamps 53 include: a front right-turn signal lamp installed on the front of the vehicle 1 in a right portion as viewed in the forward direction; a rear right-turn signal lamp installed on the rear of the vehicle 1 in a right portion as viewed in the forward direction; a front left-turn signal lamp installed on the front of the vehicle 1 in a left portion as viewed in the forward direction; and a rear left-turn signal lamp installed on the rear of the vehicle 1 in a left portion as viewed in the forward direction. The front lamps 51, rear lamps 52, and turn signal lamps 53 switch on based on, for example, control signals outputted from a lamp ECU 27 of the control unit 2.

The sensor unit 7 includes a camera unit 71, a plurality of (e.g., five) LiDAR units 72a, 72b, 72c, 72d, and 72e, a plurality of (e.g., five) radar units 73a, 73b, 73c, 73d, and 73e, a gyro sensor 74, and a GPS sensor 75.

The camera unit 71 includes a camera that captures images of a space in front of the vehicle 1. For example, the camera unit 71 is mounted on an interior side of a roof of the vehicle 1 at a position close to a windshield. The images captured by the camera unit 71 are transmitted to an on-board sensor ECU 22 (to be described later) of the control unit 2.

The LiDAR units 72a to 72e each include a light detection and ranging (LiDAR) sensor that detects an object present near the vehicle 1 by emitting pulsed laser radiation and measuring scattered light from the object. The first LiDAR unit 72a is installed on the front of the vehicle 1 in a right corner portion as viewed in the forward direction, and detects an object present in an external space slightly to the right in front of the vehicle 1. The second LiDAR unit 72b is installed on the front of the vehicle 1 in a left corner portion as viewed in the forward direction, and detects an object present in an external space slightly to the left in front of the vehicle 1. The third LiDAR unit 72c is installed on the rear of the vehicle 1 at the widthwise center, and detects an object present in an external space behind the vehicle 1. The fourth LiDAR unit 72d is installed on a right part of the vehicle 1 in a rearward portion, and detects an object present in an external space slightly rearward on the right of the vehicle 1. The fifth LiDAR unit 72e is installed on a left part of the vehicle 1 in a rearward portion, and detects an object present in an external space slightly rearward on the left of the vehicle 1. Detection signals of the LiDAR units 72a to 72e are transmitted to the on-board sensor ECU 22 of the control unit 2.

The radar units 73a to 73e each include a millimeter wave radar that detects an object present near the vehicle 1 by emitting millimeter wave radiation and measuring a wave reflected from the object. The first radar unit 73a is installed on the front of the vehicle 1 in a right corner portion as viewed in the forward direction, and detects an object present in an external space slightly to the right in front of the vehicle 1. The second radar unit 73b is installed on the front of the vehicle 1 in a left corner portion as viewed in the forward direction, and detects an object present in an external space slightly to the left in front of the vehicle 1. The third radar unit 73c is installed on the front of the vehicle 1 at the widthwise center, and detects an object present in an external space in front of the vehicle 1. The fourth radar unit 73d is installed on the rear of the vehicle 1 in a right corner portion as viewed in the forward direction, and detects an object present in an external space slightly to the right behind the vehicle 1. The fifth radar unit 73e is installed on the rear of the vehicle 1 in a left corner portion as viewed in the forward direction, and detects an object present in an external space slightly to the left behind the vehicle 1. Detection signals of the radar units 73a to 73e are transmitted to the on-board sensor ECU 22 of the control unit 2.

The gyro sensor 74 transmits a signal corresponding to turning motion of the vehicle 1 to a navigation ECU 24 (to be described later) of the control unit 2. The GPS sensor 75 transmits a signal corresponding to a current position of the vehicle 1 to the navigation ECU 24 of the control unit 2.

The first on-board communication device 41 communicates wirelessly with a server that provides map information, traffic information, etc., and acquires and transmits the information to the navigation ECU 24 of the control unit 2. The second on-board communication device 42 performs wireless inter-vehicle communication with a two-wheeled vehicle's communication device 91 mounted on the translationally-moving two-wheeled vehicle 9 that is traveling near the vehicle 1, and exchanges information between the vehicle 1 and the translationally-moving two-wheeled vehicle 9.

The control unit 2 includes a plurality of ECUs 20 to 29 that are communicatively connected via an intra-vehicle network. Each of the ECUs 20 to 29 is a computer that includes a processor a representative example of which is a CPU, a storage device, such as a semiconductor memory, and an interface with an external device. The storage device of each of the ECUs 20 to 29 stores, for example, computer programs to be executed by the processor and data for use in processing by the processor. Each of the ECUs 20 to 29 may include, for example, a plurality of processors, a plurality of storage devices, and a plurality of interfaces. Functions of the ECUs 20 to 29 will be described below. Note that the number of the ECUs and the function of each of the ECUs 20 to 29 can be designed as appropriate. The function of each ECU can be subdivided more than in the present embodiment, or can be integrated with the function of another ECU.

An automatic operation ECU 20 is a computer that is mainly responsible for control related to automatic operation of the vehicle 1. In an automatic operation mode, the automatic operation ECU 20 automatically controls at least one of steering of the vehicle 1, acceleration/deceleration of the vehicle 1, and inter-vehicle communication with another vehicle. Specific examples of the automatic operation control performed by the automatic operation ECU 20 include lane keeping control, lane departure prevention control (road departure mitigation control), lane change control, forward vehicle tracking control, contact avoidance control, unintended starting restraint control, and two-wheeled vehicle blind spot warning control.

The lane keeping control is a type of control on a position of the vehicle 1 with respect to a lane, and is performed to make the vehicle 1 move automatically (not by the driver's steering operation) on a traveling track set in the lane. The lane departure prevention control is a type of control on a position of the vehicle 1 with respect to a lane, and is performed to detect a white line or a median strip and to automatically steer the vehicle 1 while preventing the vehicle 1 from crossing the white line or the median strip. As can be seen, the lane departure prevention control and the lane keeping control differ in function from each other.

The lane change control is performed to make the vehicle 1 automatically move from a lane where the vehicle 1 is currently traveling to an adjoining lane. The forward vehicle tracking control is performed to make the vehicle 1 automatically track a vehicle ahead. The unintended starting restraint control is performed to inhibit sudden start in such a manner that when acceleration operation amount by the driver is more than a predetermined amount while the vehicle is stopped, the acceleration is restrained.

The contact avoidance control is performed when a predetermined actuation condition correlated with the possibility of contact with objects (obstacles and other vehicles including the translationally-moving two-wheeled vehicle 9) in front of or alongside the vehicle 1 is satisfied, so that an automatic operation of at least one of the power plant 32, the braking device 33, and the electric power steering device 31 is performed to avoid or lessen contact between the objects and the host vehicle. When performing the contact avoidance control, the automatic operation ECU 20 calculates a contact time estimate, which is a time that can be taken until the object and the host vehicle come into contact with each other, based on detection results of the on-board sensor ECU 22 or other components, the detection results including, for example, the position and speed of the object and the distance from the host vehicle to the object. The automatic operation ECU 20 starts the above-mentioned automatic operation in response to the contact time estimate becoming less than a predetermined contact time threshold (i.e., in response to the actuation condition being satisfied).

The two-wheeled vehicle blind spot warning control is performed when the translationally-moving two-wheeled vehicle 9 is present in front of or alongside the vehicle 1 as the host vehicle and the host vehicle is present at the blind spot BR or BL (see FIG. 2) of the translationally-moving two-wheeled vehicle 9, so that the host vehicle transmits a warning notification to the translationally-moving two-wheeled vehicle 9 by way of the inter-vehicle communication in order to prevent contact between the host vehicle and the translationally-moving two-wheeled vehicle 9. The specific procedure of this two-wheeled vehicle blind spot warning control will be described in detail later with reference to FIG. 3.

The steering ECU 21 is a computer that is mainly responsible for control of the electric power steering device 31. The steering ECU 21 assists the driver in performing a steering operation of the steering wheel 61, by generating a control signal based on a steering angle and a steering speed detected by the steering sensor 31d and inputting the control signal into the electric motor 31c. In addition, when the vehicle 1 is in the automatic operation mode, the steering ECU 21 generates a control signal in response to a command from the automatic operation ECU 20 and inputs the control signal into the electric motor 31c to cause the electric motor 31c to generate driving power for automatically steering the front wheels Wf, thereby controlling the direction of motion of the vehicle 1.

The on-board sensor ECU 22 controls the camera unit 71, the LiDAR units 72a to 72e, and the radar units 73a to 73e, which are included in the sensor unit 7 and which detect objects around the vehicle 1, and performs information processing using detection results of the units 71, 72a to 72e, and 73a to 73e.

More specifically, the on-board sensor ECU 22 can determine positions of objects (obstacles and other vehicles including the translationally-moving two-wheeled vehicle 9) around the host vehicle, distances from the host vehicle to the objects, and speeds of the objects, and can extract contours of the objects and a lane demarcation line (e.g., a white line) on a road, by analyzing the images captured by the camera unit 71 and the detection signals from the LiDAR units 72a to 72e and the radar units 73a to 73e. Accordingly, in the present embodiment, the on-board sensor ECU 22, the camera unit 71, the LiDAR units 72a, 72b, 72d, and 72e and the radar units 73a to 73c constitute a saddle-type vehicle detection unit that detects a saddle-type vehicle traveling in front of or alongside the host vehicle in the direction in which the host vehicle moves.

The navigation ECU 24 is a computer that controls the gyro sensor 74, the GPS sensor 75, and the first on-board communication device 41, and that processes information, such as detection results and communication results of the gyro sensor 74, the GPS sensor 75, and the first on-board communication device 41. More specifically, the navigation ECU 24 acquires, for example, information regarding a current route that the vehicle 1 is taking and information regarding a current position of the vehicle 1 in motion, based on the detection results of the gyro sensor 74 and the GPS sensor 75 and a database 78 of map information built in the storage device. In addition, the navigation ECU 24 can conduct, for example, a search for a route from the current position to a destination, based on the map information, traffic information, etc. acquired via the first on-board communication device 41.

An inter-vehicle communication ECU 25 is a computer that is mainly responsible for control of the second on-board communication device 42. When the translationally-moving two-wheeled vehicle 9 equipped with the two-wheeled vehicle's communication device 91, which is capable of wireless inter-vehicle communication with the second on-board communication device 42, is present near the vehicle 1, the inter-vehicle communication ECU 25 wirelessly transmits various pieces of information to the two-wheeled vehicle's communication device 91 via the second on-board communication device 42. Accordingly, in the present embodiment, the inter-vehicle communication ECU 25 and the second on-board communication device 42 constitute an inter-vehicle communication unit that enables communication with the two-wheeled vehicle's communication device 91 mounted on the translationally-moving two-wheeled vehicle 9 traveling near the host vehicle.

A power plant ECU 26 is a computer that is mainly responsible for control of the power plant 32. For example, the power plant ECU 26 controls the output of the engine based on the accelerating/decelerating operations performed by the driver via the accelerator pedal 62, and changes gear shifts of the transmission based on information, such as a vehicle speed, detected by a vehicle speed sensor (not illustrated).

When the vehicle 1 is in the automatic operation mode, the power plant ECU 26 automatically controls the power plant 32 based on a command from the automatic operation ECU 20, thereby controlling acceleration and deceleration of the vehicle 1.

The lamp ECU 27 is a computer that is mainly responsible for control of the group 5 of lamps. When the vehicle 1 is in motion, the lamp ECU 27 turns on and off the lamps belonging to the group 5 of lamps in response to turn-on and turn-off operations performed by the driver via the lamp switch 64. When the vehicle 1 is in the automatic operation mode, the lamp ECU 27 turns on and off the lamps belonging to the group 5 of lamps based on a command from the automatic operation ECU 20.

A braking device ECU 29 is a computer that is mainly responsible for control of the braking device 33 and a parking lock mechanism of the transmission. The braking device ECU 29 controls the disc brake device based on a decelerating operation performed by the driver via the brake pedal 63. When the vehicle 1 is in the automatic operation mode, the braking device ECU 29 controls deceleration and stopping of the vehicle 1 by automatically controlling the disc brake device based on a command from the automatic operation ECU 20. When the vehicle 1 is parked, the braking system ECU 29 actuates the parking brake based on an operation performed by the driver via a parking brake button (not illustrated), and actuates the parking lock mechanism provided to the transmission based on an operation performed by the driver via a shift lever (not illustrated).

The translationally-moving two-wheeled vehicle 9 is equipped with the two-wheeled vehicle's communication device 91 capable of wireless inter-vehicle communication with the second on-board communication device 42 of the vehicle 1, and with an alarm device 92 connected to the two-wheeled vehicle's communication device 91. The alarm device 92 informs the rider of the translationally-moving two-wheeled vehicle 9 of contents of information received by the two-wheeled vehicle's communication device 91, in a manner recognizable to the rider. In the following, a case will be described in which an indicator that displays a message corresponding to the information received by the two-wheeled vehicle's communication device 91 and/or turns on a warning light is used as the alarm device 92. However, the present invention is not limited to such a case. The alarm device 92 may be a headset that generates sound corresponding to the information received by the two-wheeled vehicle's communication device 91. Alternatively, the alarm device 92 may be configured as a vibrator that independently vibrates the left and right handlebars of the translationally-moving two-wheeled vehicle 9 in a manner corresponding to the information received by the two-wheeled vehicle's communication device 91.

Figure 3:
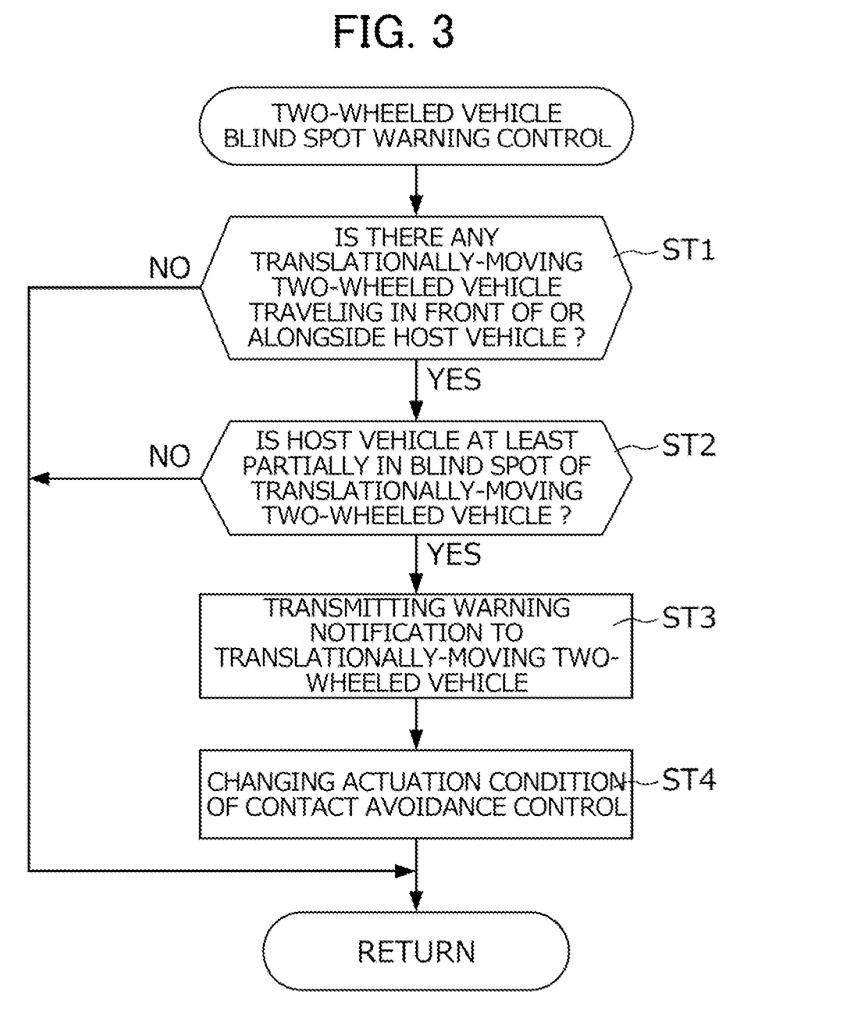
FIG. 3 is a flowchart illustrating a specific procedure of two-wheeled vehicle blind spot warning control.

FIG. 3 is a flowchart illustrating a specific procedure of the two-wheeled vehicle blind spot warning control. The process illustrated in FIG. 3 is repeatedly performed by the automatic operation ECU 20 in a predetermined cycle while the vehicle 1 is in motion. The steps illustrated in FIG. 3 are performed by the automatic operation ECU 20 executing computer programs stored in the storage device (not illustrated) while the vehicle 1 is in motion.

First, in Step ST1, the automatic operation ECU 20 determines whether there is a translationally-moving two-wheeled vehicle 9 traveling in front of or alongside the host vehicle in the direction in which the host vehicle moves, based on detection results of the saddle-type vehicle detection unit. If the determination result in Step ST1 is NO, the automatic operation ECU 20 ends the process illustrated in FIG. 3; if the determination result is YES, the automatic operation ECU 20 proceeds to Step ST2.

Next, in Step ST2, the automatic operation ECU 20 determines whether the host vehicle is at least partially in the right blind spot BR or the left blind spot BL of the translationally-moving two-wheeled vehicle 9 detected in Step ST1, based on detection results of the saddle-type vehicle detection unit. If the determination result in Step ST2 is NO, the automatic operation ECU 20 determines that the rider of the translationally-moving two-wheeled vehicle 9 can recognize the presence of the host vehicle, and ends the process illustrated in FIG. 3. If the determination result in Step ST2 is YES, the automatic operation ECU 20 proceeds to Step ST3.

Next, in Step ST3, following the determination that the host vehicle is at least partially in the right blind spot BR or the left blind spot BL of the translationally-moving two-wheeled vehicle 9, the automatic operation ECU 20 transmits a warning notification from the second on-board communication device 42 to the two-wheeled vehicle's communication device 91 mounted on the translationally-moving two-wheeled vehicle 9 to inform the presence of the host vehicle at the blind spot BR, BL of the translationally-moving two-wheeled vehicle 9. Thereafter, the automatic operation ECU 20 proceeds to Step ST4. It is preferable that the warning notification transmitted from the second on-board communication device 42 to the two-wheeled vehicle's communication device 91 includes information indicating whether the host vehicle is at the right blind spot BR or the left blind spot BL of the translationally-moving two-wheeled vehicle 9. Upon receipt of the warning notification by the two-wheeled vehicle's communication device 91 of the translationally-moving two-wheeled vehicle 9, the alarm device 92 displays a message corresponding to the warning notification and/or turns on a warning light, thereby alerting the rider of the translationally-moving two-wheeled vehicle 9 to the presence of the host vehicle at the right blind spot BR or the left blind spot BL. In the case where the alarm device 92 is configured as a vibrator that vibrates the handlebars of the translationally-moving two-wheeled vehicle 9, it is preferable that the vibrator vibrates the right handlebar of the translationally-moving two-wheeled vehicle 9 in response to reception of information indicating that a vehicle is present at the right blind spot BR, and that the vibrator vibrates the left handlebar of the translationally-moving two-wheeled vehicle 9 in response to reception of information indicating that a vehicle is present at the left blind spot BL. This allows the rider of the translationally-moving two-wheeled vehicle 9 to recognize at which of the right blind spot BR or the left blind spot BL the vehicle is present, without having to turn his/her eyes upon the indicator.

Next, in Step ST4, following the determination that the host vehicle is at least partially in the right blind spot BR or the left blind spot BL of the translationally-moving two-wheeled vehicle 9, the automatic operation ECU 20 temporarily changes the actuation condition of this automatic operation so that the automatic operation according to the above-described contact avoidance control is started more promptly than when the host vehicle is determined to be outside the blind spots BR and BL. Thereafter, the automatic operation ECU 20 ends the process illustrated in FIG. 3. More specifically, the automatic operation ECU 20 temporarily changes the contact time threshold, which is a threshold set with respect to the contact time estimate, to a value greater than a normal value. As a result, even in a situation where the rider of the translationally-moving two-wheeled vehicle 9 fails to recognize the warning notification and the translationally-moving two-wheeled vehicle 9 moves in such a way as to interfere with the host vehicle in motion, the automatic operation to avoid or lessen contact can be started immediately, thereby making it possible to further reliably prevent the contact between the host vehicle and the translationally-moving two-wheeled vehicle 9.

The vehicle 1 according to the present invention and the method for controlling the vehicle 1 exert the following effects.

(1) The automatic operation ECU 20 of the vehicle 1 as the host vehicle determines whether the host vehicle is at either one of the right blind spot BR and the left blind spot BL of the translationally-moving two-wheeled vehicle 9, based on the detection results of the saddle-type vehicle detection unit that detects the translationally-moving two-wheeled vehicle 9 traveling in front of or alongside the host vehicle. When determining that the host vehicle is at the blind spot BR or BL, the automatic operation ECU 20 transmits the warning notification from the second on-board communication device 42 to the two-wheeled vehicle's communication device 91. This feature allows the rider of the translationally-moving two-wheeled vehicle 9 to recognize the presence of the vehicle 1 at the blind spot BR or BL of the translationally-moving two-wheeled vehicle 9. Thus, the vehicle 1 as the host vehicle can cause the rider of the translationally-moving two-wheeled vehicle 9 to refrain from driving the translationally-moving two-wheeled vehicle 9 in such a way as to interfere with the host vehicle in motion (for example, from suddenly changing lanes), thereby making it possible to prevent contact between the host vehicle and the translationally-moving two-wheeled vehicle 9. The present embodiment allows the rider of the motorcycle 9 to recognize the presence of the vehicle 1 at the blind spot BR, BL of the motorcycle 9, while eliminating the need for a camera, a LiDAR, a radar, etc., thereby reducing costs of the motorcycle 9.

(2) The vehicle 1 as the host vehicle includes the automatic operation ECU 20 that performs an automatic operation of at least one of the power plant 32, the braking device 33, and the electric power steering device 31 of the host vehicle, upon fulfillment of the predetermined actuation condition, such that contact between the host vehicle and the translationally-moving two-wheeled vehicle 9 is avoided or lessened. When determining that the host vehicle is at the blind spot BR or BL of the translationally-moving two-wheeled vehicle 9, the automatic operation ECU 20 transmits the warning notification to the two-wheeled vehicle's communication device 91 and changes the actuation condition so that the automatic operation is started more promptly than when the host vehicle is determined to be outside the blind spots BR and BL of the translationally-moving two-wheeled vehicle 9. As a result, even in a situation where the rider of the translationally-moving two-wheeled vehicle 9 fails to recognize the warning notification and the translationally-moving two-wheeled vehicle 9 moves in such a way as to interfere with the host vehicle in motion, the automatic operation to avoid or lessen the contact can be started immediately, thereby making it possible to further reliably prevent the contact between the host vehicle and the translationally-moving two-wheeled vehicle 9.

It should be noted that the embodiment described above is not intended to limit the present invention. Appropriate modifications may be made to the specifics of the present invention without deviating from the spirit of the present invention.

In the above embodiment, a motorcycle is described as an example of the saddle-type vehicle. However, the present invention is not limited to this example. Examples of saddle-type vehicle include, in addition to motorcycles, saddle-type three-wheeled vehicles, motorized bicycles, etc.

In the above embodiment, the case is described in which the second on-board communication device 42, which is capable of direct wireless inter-vehicle communication with the two-wheeled vehicle's communication device 91 mounted on the translationally-moving two-wheeled vehicle 9, is used as the on-board communication unit that transmits the warning notification to the two-wheeled vehicle's communication device 91. However, the present invention is not limited to this case. The warning notification may be transmitted to the two-wheeled vehicle's communication device 91 via a server (not illustrated), although this communication takes more time than the inter-vehicle communication by means of the second on-board communication device 42.

What is claimed is:

1. A vehicle as a host vehicle comprising:
    a sensor unit including at least any of a camera, a lidar, and a radar;
    a saddle-type vehicle detector configured to detect a saddle-type vehicle traveling in front of or alongside the host vehicle in a direction in which the host vehicle moves, based on a detection signal of the sensor unit;
    an on-board communication processor capable of communicating wirelessly with a saddle-type vehicle's communication device mounted on the saddle-type vehicle; and
    a controller configured to determine whether the host vehicle is at a right blind spot or a left blind spot of the saddle-type vehicle, based on a detection result of the saddle-type vehicle detector, and transmit a warning notification from the on-board communication processor to the saddle-type vehicle's communication device via wireless communication when determining that the host vehicle is at the right or left blind spot, wherein
    the warning notification includes information that activates an alarm device mounted on the saddle-type vehicle to alert the rider of the saddle-type vehicle whether the host vehicle exists in the right or left blind spot.

2. The vehicle as the host vehicle according to claim 1, further comprising:
    a safe driving support device that performs, upon fulfillment of a predetermined actuation condition, an automatic operation of at least one of a drive device, a braking device, and a steering device of the host vehicle such that contact between the saddle-type vehicle and the host vehicle is avoided or lessened,
    wherein when determining that the host vehicle is at the blind spot, the controller changes the actuation condition so that the automatic operation is started more promptly than when determining that the host vehicle is not at the blind spot.

3. A method for controlling a vehicle as a host vehicle including
    a sensor unit including at least any of a camera, a lidar, and a radar;
    a saddle-type vehicle detector configured to detect a saddle-type vehicle traveling in front of or alongside the host vehicle in a direction in which the host vehicle moves, based on a detection signal of the sensor unit; and
    an on-board communication processor capable of communicating wirelessly with a saddle-type vehicle's communication device mounted on the saddle-type vehicle, the method comprising:
    determining whether the host vehicle is at a right blind spot or a left blind spot of the saddle-type vehicle, based on a detection result of the saddle-type vehicle detector; and
    transmitting a warning notification from the on-board communication processor to the saddle-type vehicle's communication device via wireless communication when the host vehicle is determined to be at the right or left blind spot, wherein
    the warning notification includes information that activates an alarm device mounted on the saddle-type vehicle to alert the rider of the saddle-type vehicle whether the host vehicle exists in the right or left blind spot.

* * * * *